(12) United States Patent
He et al.

(10) Patent No.: US 8,464,307 B2
(45) Date of Patent: Jun. 11, 2013

(54) INTEGRATED DIGITAL BROADCASTING RECEIVER SYSTEM

(75) Inventors: Wei-Hung He, Taipei County (TW); Chin-Tai Chen, Taoyuan County (TW); Shieh-Hsing Kuo, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 672 days.

(21) Appl. No.: 12/080,203

(22) Filed: Apr. 1, 2008

(65) Prior Publication Data
US 2008/0256588 A1 Oct. 16, 2008

(30) Foreign Application Priority Data

Apr. 11, 2007 (TW) ................................ 96112704 A (51) Int. Cl.
*H04N 7/173* (2011.01)
(52) U.S. Cl.
USPC ............ 725/131; 725/100; 725/139; 725/151
(58) Field of Classification Search
None
See application file for complete search history.

(56) References Cited

U.S. PATENT DOCUMENTS

| | | | |
|---|---|---|---|
| 5,636,252 A * | 6/1997 | Patel et al. | 375/345 |
| 6,588,017 B1 * | 7/2003 | Calderone | 725/120 |
| 6,622,307 B1 * | 9/2003 | Ho | 725/120 |
| 2006/0240782 A1 * | 10/2006 | Pollman et al. | 455/67.11 |

\* cited by examiner

*Primary Examiner* — Cai Chen
(74) *Attorney, Agent, or Firm* — McClure, Qualey & Rodack, LLP (57) ABSTRACT

An audiovisual processing system comprises a signal receiving circuit and a host device. The signal receiving circuit comprises a tuner and a demodulator. The tuner generates a tuned signal based on a radio frequency signal. The demodulator generates a digital signal based on the tuned signal, generates a frequency down-converted signal based on the digital signal, generates an audio processing signal based on the frequency down-converted signal in an audio processing mode, generates a demodulated video signal based on the frequency down-converted signal in a video processing mode, generates an output signal based on the audio processing signal in the audio processing mode, and generates the output signal based on the demodulated video signal in the video processing mode. The host device receives the output signal, and generates a demodulated audio signal based on the output signal in the audio processing mode.

7 Claims, 7 Drawing Sheets

INTEGRATED DIGITAL BROADCASTING RECEIVER SYSTEM

CROSS-REFERENCE TO RELATED APPLICATION

This application claims priority of Taiwanese Application No. 096112704, filed on Apr. 11, 2007.

BACKGROUND OF THE INVENTION

1. Field of the Invention

The invention relates to a receiver system, more particularly to an integrated digital broadcasting receiver system, such as an audiovisual processing system.

2. Description of the Related Art

Figure 1:
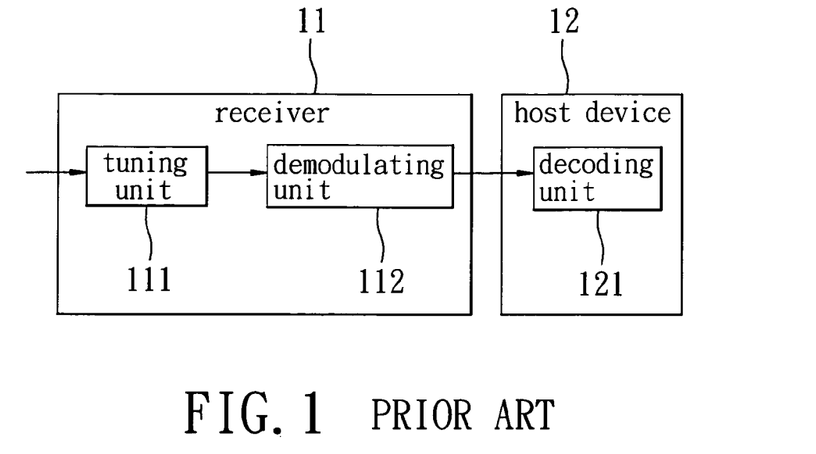
FIG. 1 is a block diagram to illustrate a receiver and a host device of the prior art.

With the sweeping trend of digitalization in every sector, digital broadcasting is expected to take the place of analog broadcasting in the future. Referring to FIG. 1, generally, a host device 12 is connected externally to a receiver 11 (such as a signal receiving circuit) for reception and playback of digital broadcasting data. Transmission of data between the receiver 11 and the host device 12 is via a universal serial bus (USB) interface or a peripheral component interconnect-express (PCI-E) interface.

The receiver 11 comprises a tuning unit 111 (such as a tuner) and a demodulating unit 112 (such as a demodulator). The host device 12 comprises a decoding unit 121 (such as a decoder).

The tuning unit 111 receives a radio frequency signal, extracts a required component from the radio frequency signal, and transforms the extracted component into an intermediate frequency signal. The demodulating unit 112 transforms the intermediate frequency signal into a baseband signal, demodulates the baseband signal into a transport stream complying with a standard set by the Motion Picture Expert Group (MPEG), and transmits the transport stream to the decoding unit 121 of the host device 12 for decoding.

Typically, the receiver 11 is realized by hardware, and the decoding unit 121 of the host device 12 is realized by software.

Since current digital broadcasting specifications are diverse, and since the conventional receiver 11 supports only one specification, if playback of broadcasting data in different specifications is intended, the user needs to buy additional receivers supporting various specifications, which is inconvenient in terms of use. Therefore, there is a need for a receiver capable of supporting various specifications.

SUMMARY OF THE INVENTION

Therefore, one object of the present invention is to provide a signal receiving circuit that can support various specifications.

Accordingly, a signal receiving circuit of this invention is adapted to generate an output signal based on a radio frequency signal, and comprises a tuner and a demodulator. The tuner generates a tuned signal based on the radio frequency signal. The demodulator generates the output signal based on the tuned signal, and comprises an analog-to-digital converter, a frequency down-converter, an audio processing circuit, a video processing circuit, and an interface circuit. The analog-to-digital converter generates a digital signal based on the tuned signal. The frequency down-converter generates a frequency down-converted signal based on the digital signal. The audio processing circuit generates a demodulated audio signal based on the frequency down-converted signal in an audio processing mode. The video processing circuit generates a demodulated video signal based on the frequency down-converted signal in a video processing mode. The interface circuit generates the output signal based on one of the demodulated audio signal and the demodulated video signal.

Another object of this invention is to provide an audiovisual processing system that can support various specifications.

Accordingly, the audiovisual processing system of this invention comprises a signal receiving circuit and a host device. The signal receiving circuit is adapted to generate an output signal based on a radio frequency signal, and comprises a tuner and a demodulator. The tuner generates a tuned signal based on the radio frequency signal. The demodulator generates the output signal based on the tuned signal, and comprises an analog-to-digital converter, a frequency down-converter, an audio pre-processing circuit, a video processing circuit, and an interface circuit. The analog-to-digital converter generates a digital signal based on the tuned signal. The frequency down-converter generates a frequency down-converted signal based on the digital signal. The audio pre-processing circuit generates an audio processing signal based on the frequency down-converted signal in an audio processing mode. The video processing circuit generates a demodulated video signal based on the frequency down-converted signal in a video processing mode. The interface circuit generates the output signal based on the audio processing signal in the audio processing mode, and generates the output signal based on the demodulated video signal in the video processing mode. The host device is coupled to the signal receiving circuit for receiving the output signal, and generates a demodulated audio signal based on the output signal in the audio processing mode.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
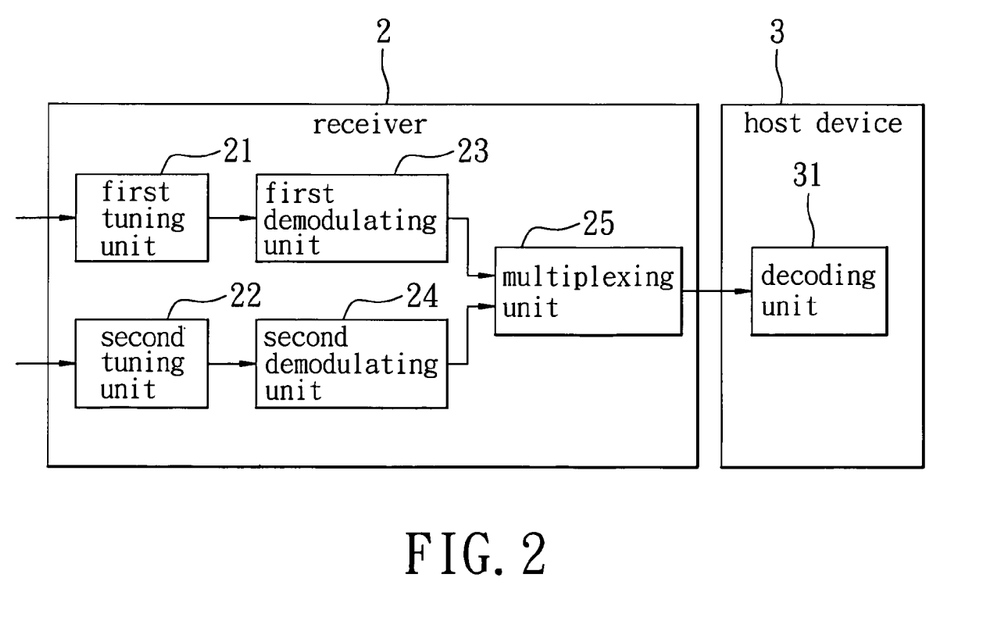
FIG. 2 is a block diagram to illustrate the first preferred embodiment of an integrated digital broadcasting receiver system according to the invention.

Referring to FIG. 2, the first preferred embodiment of an integrated digital broadcasting receiver system according to the present invention is adapted for digital video broadcasting-terrestrial (DVB-T) and digital audio broadcasting (DAB), and is operable under one of a DVB-T mode and a DAB mode.

The first preferred embodiment comprises a receiver 2 and a host device 3. Transmission of data between the receiver 2 and the host device 3 is conducted through an interface. The receiver 2 comprises a first tuning unit 21, a second tuning unit 22, a first demodulating unit 23, a second demodulating unit 24, and a multiplexing unit 25. The host device 3 comprises a decoding unit 31.

The first tuning unit 21 receives a radio frequency signal, extracts a DVB-T component from the radio frequency signal, and transforms the extracted DVB-T component into an intermediate frequency signal.

The first demodulating unit 23 transforms the intermediate frequency signal from the first tuning unit 21 into a baseband signal, and demodulates the baseband signal into an MPEG transport stream. Operations executed by the first demodulating unit 23 comprise analog-to-digital conversion, frequency down-conversion, filtering, re-sampling, fast Fourier transform, channel estimation, symbol demapping, deinterleaving, and Viterbi decoding.

The second tuning unit 22 receives a radio frequency signal, extracts a DAB component from the radio frequency signal, and transforms the extracted DAB component into an intermediate frequency signal.

The second demodulating unit 24 transforms the intermediate frequency signal from the second tuning unit 22 into a baseband signal, and demodulates the baseband signal into an MPEG transport stream. Operations executed by the second demodulating unit 24 comprise digital-to-analog conversion, frequency down-conversion, filtering, re-sampling, DAB mode automatic detection, frequency bias detection/compensation, signal frame/symbol edge detection, fast Fourier transform, differential quadrature phase shift keying (D-QPSK) demodulation, deinterleaving, fast information channel (FIC)/main service channel (MSC) Viterbi decoding, and FIC decoding.

When operating under the DVB-T mode, the multiplexing unit 25 transmits the MPEG transport stream from the first demodulating unit 23 to the decoding unit 31 of the host device 3 for further decoding. When operating under the DAB mode, the multiplexing unit 25 transmits the MPEG transport stream from the second demodulating unit 24 to the decoding unit 31 of the host device 3 for further decoding.

Figure 3:
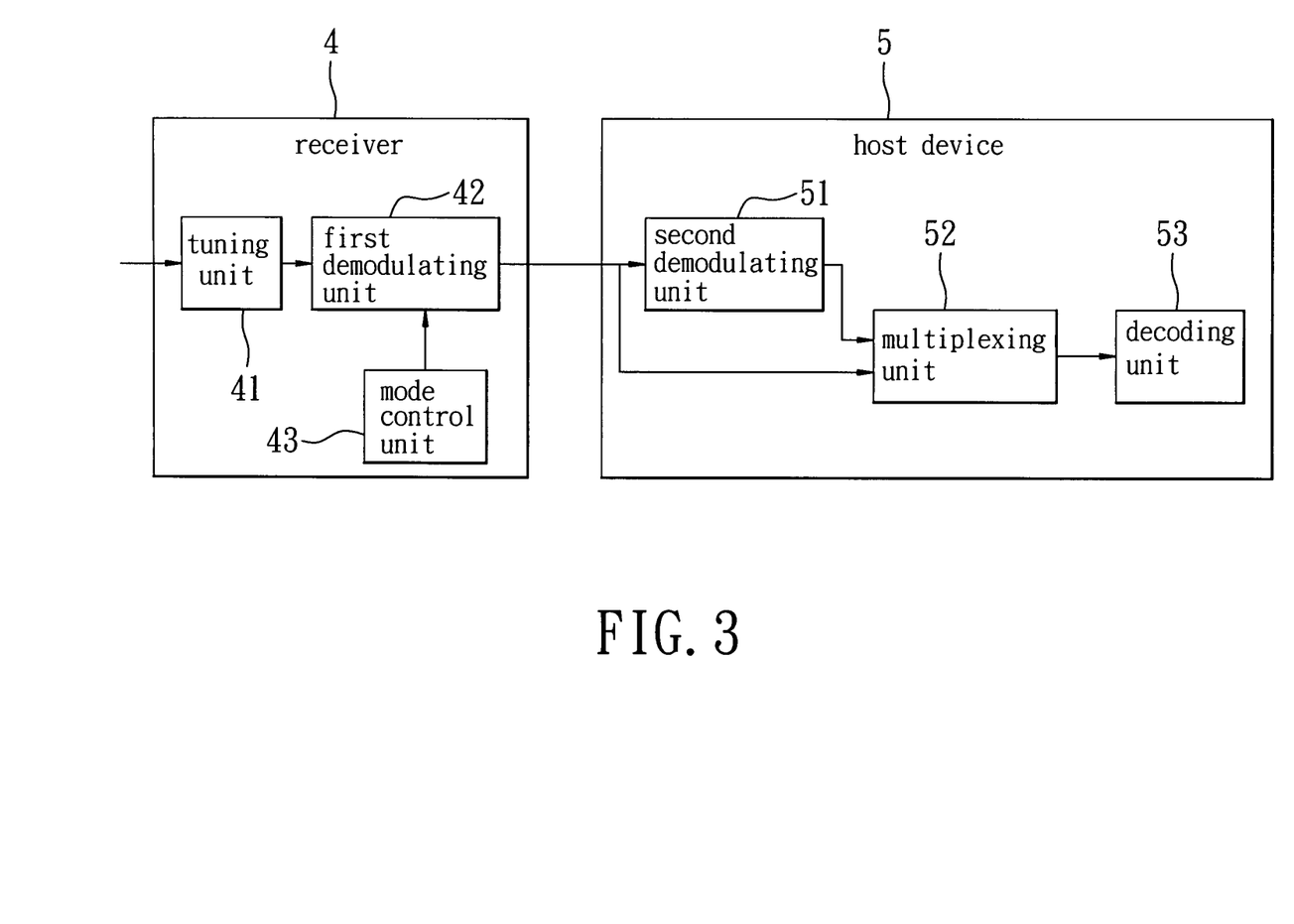
FIG. 3 is a block diagram to illustrate the second preferred embodiment of an integrated digital broadcasting receiver system according to the invention.
Figure 4:
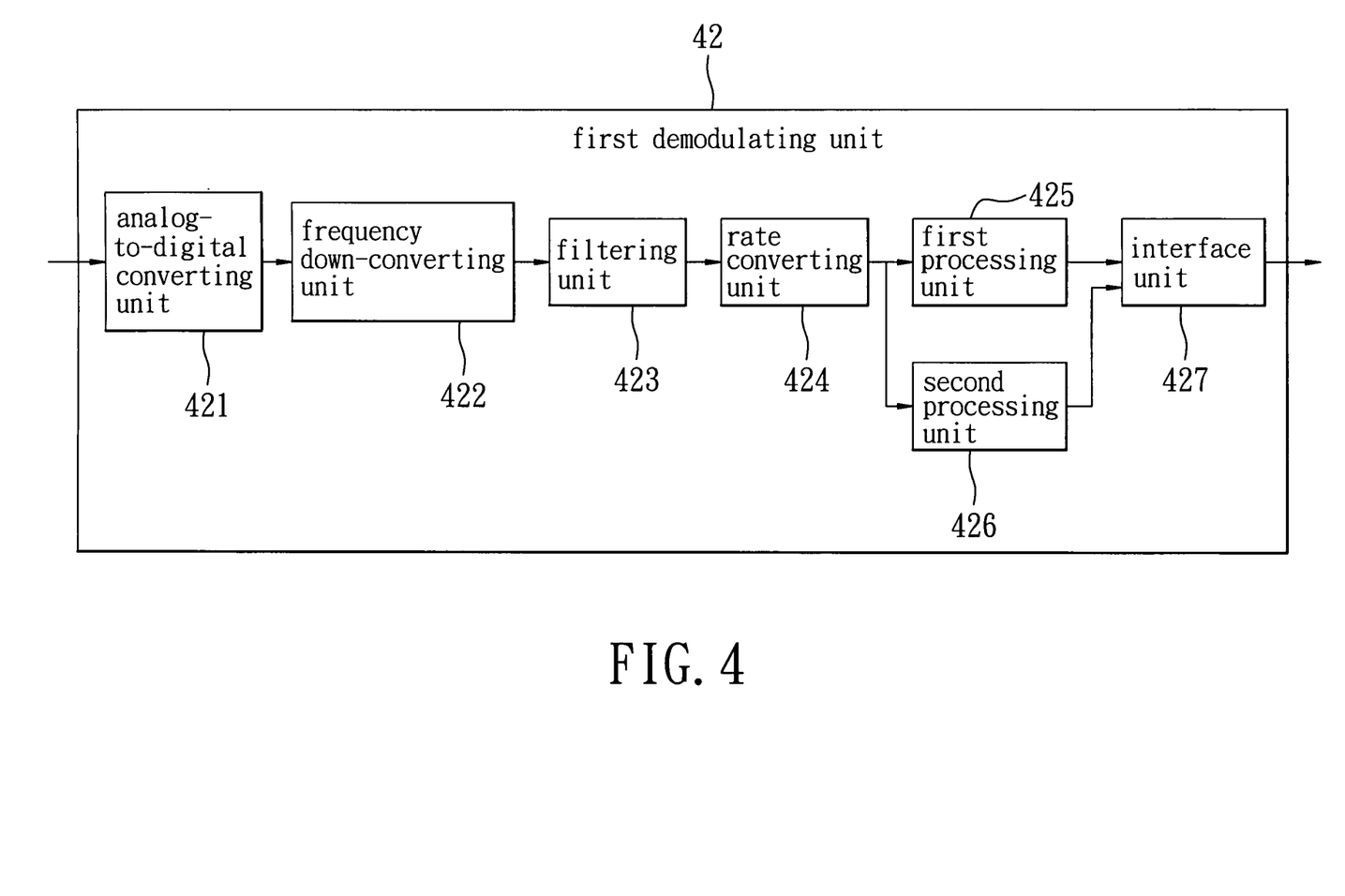
FIG. 4 is a block diagram to illustrate a first demodulating unit of the second preferred embodiment.

Referring to FIGS. 3 and 4, the second preferred embodiment of an integrated digital broadcasting receiver system (such as an audiovisual processing system) according to the present invention is adapted for DVB-T and DAB, and is operable under a DVB-T mode (i.e., a video processing mode) and a DAB mode (i.e., an audio processing mode).

The second preferred embodiment comprises a receiver 4 (e.g., a signal receiving circuit) and a host device 5. Transmission of data between the receiver 4 and the host device 5 is conducted through an interface. The receiver 4 comprises a tuning unit 41 (such as a tuner), a first demodulating unit 42 (such as a demodulator), and a mode control unit 43 (such as a mode control circuit). The host device 5 comprises a second demodulating unit 51 (such as an audio demodulating circuit), a multiplexing unit 52 (such as a selection circuit), and a decoding unit 53 (such as a decoder).

The tuning unit 41 receives a radio frequency signal, extracts DVB-T and DAB components of the radio frequency signal, and transforms the extracted DVB-T and DAB components into an intermediate frequency signal (such as a tuned signal).

The first demodulating unit 42 comprises an analog-to-digital converting unit 421 (such as an analog-to-digital converter), a frequency down-converting unit 422 (such as a frequency down-converter), a filtering unit 423, a rate converting unit 424, a first processing unit 425 (such as a video processing circuit), a second processing unit 426 (such as an audio pre-processing circuit), and an interface unit 427 (such as an interface circuit).

The analog-to-digital converting unit 421 performs analog-to-digital conversion on the intermediate frequency signal from the tuning unit 41 so as to generate a digital signal. The frequency down-converting unit 422 performs frequency down-conversion on the digital signal from the analog-to-digital converting unit 421 so as to generate a baseband signal (such as a frequency down-converted signal). The filtering unit 423 filters out high-frequency components of the baseband signal so as to generate a filtered signal. The rate converting unit 424 re-samples the filtered signal from the filtering unit 423 for conversion to an appropriate sampling rate so as to generate a converted signal. The analog-to-digital converting unit 421, the frequency down-converting unit 422, the filtering unit 423, and the rate converting unit 424 may have different coefficients under the DVB-T mode and the DAB mode.

The first processing unit 425 operates in the DVB-T mode, and performs demodulation operations, comprising fast Fourier transform, channel estimation, symbol demapping, deinterleaving, and Viterbi decoding, on the converted signal from the rate converting unit 424 so as to generate an MPEG transport stream (such as a demodulated video signal).

The second processing unit 426 operates in the DAB mode, and performs filtering and rate conversion on the converted signal from the rate converting unit 424 so as to generate a baseband stream (such as an audio processing signal). In this embodiment, the tuning unit 41, the analog-to-digital converting unit 421, and the frequency down-converting unit 422 are shared in the DVB-T mode and the DAB mode, but the frequency band and the bandwidth used by DVB-T and DAB vary. The second processing unit 426 is used to perform frequency down-conversion and to filter out unnecessary adjacent channels with respect to the lower frequency band and narrower bandwidth characteristics of DAB.

Figure 5:
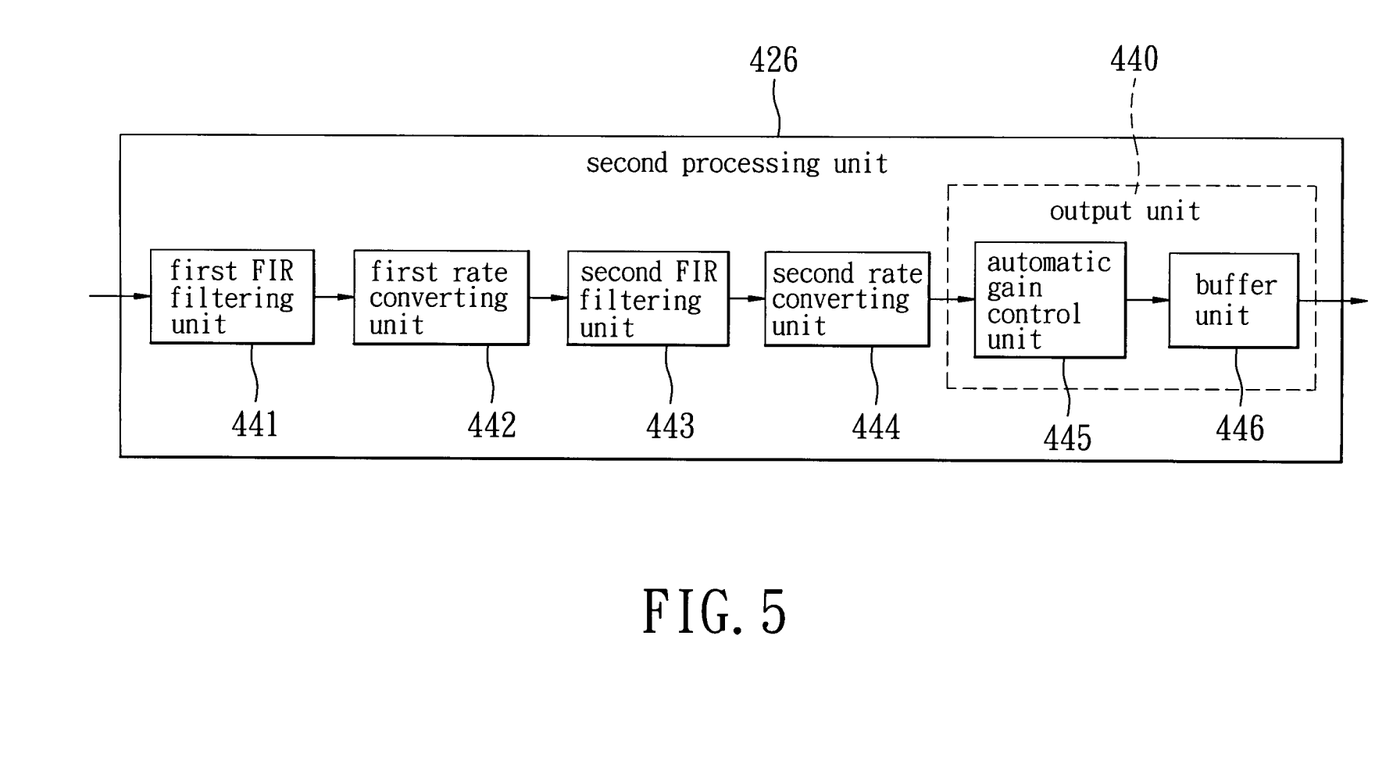
FIG. 5 is a block diagram to illustrate a second processing unit of the first demodulating unit of the second preferred embodiment.

Referring to FIG. 5, the second processing unit 426 comprises, in sequence, a first finite impulse response (FIR) filtering unit 441 (such as an audio filtering unit), a first rate converting unit 442 (such as an audio rate converting unit), a second FIR filtering unit 443 (such as an audio filtering unit), a second rate converting unit 444 (such as an audio rate converting unit), and an output unit 440. The output unit 440 comprises an automatic gain control unit 445 (such as an automatic gain control circuit) and a buffer unit 446 (such as a buffer) which are connected in series and in sequence. The first and second FIR filtering units 441, 443 are used to filter out unnecessary signal components. The first and second rate converting units 442, 444 are used to convert to an appropriate sampling rate by signal re-sampling. The automatic gain control unit 445 is used to adjust magnitude of the signal so as to generate the audio processing signal. The buffer unit 446 is used for temporary signal storage.

Referring once again to FIGS. 3 and 4, when operating under the DVB-T mode, the interface unit 427 converts the MPEG transport stream generated by the first processing unit 425 into a signal transmittable thereby, which serves as an output (such as an output signal) of the receiver 4. When operating under the DAB mode, the interface unit 427 converts the baseband stream generated by the second processing unit 426 into a signal transmittable thereby, which serves as an output of the receiver 4.

The mode control unit 43 controls the first demodulating unit 42 to operate according to one of the the DVB-T mode and the DAB mode.

The second demodulating unit 51 operates under the DAB mode, and performs demodulation operations, comprising DAB mode automatic detection, frequency bias detection/compensation, signal frame/symbol edge detection, fast Fourier transform, D-QPSK demodulation, deinterleaving, FIC/MSC Viterbi decoding, and FIC decoding, on the output of the receiver 4 (which is the baseband stream generated by the second processing unit 426 at this stage), so as to generate an MPEG transport stream (such as a demodulated audio signal). In this embodiment, the second demodulating unit 51 can be realized using hardware or software.

When operating under the DVB-T mode, the multiplexing unit 52 transmits the output of the receiver 4 (which is the MPEG transport stream from the first processing unit 425 at this stage) to the decoding unit 53 for further decoding so as to generate a decoded signal. When operating under the DAB mode, the multiplexing unit 52 transmits the MPEG transport stream from the second demodulating unit 51 to the decoding unit 53 for further decoding so as to generate the decoded signal.

Figure 6:
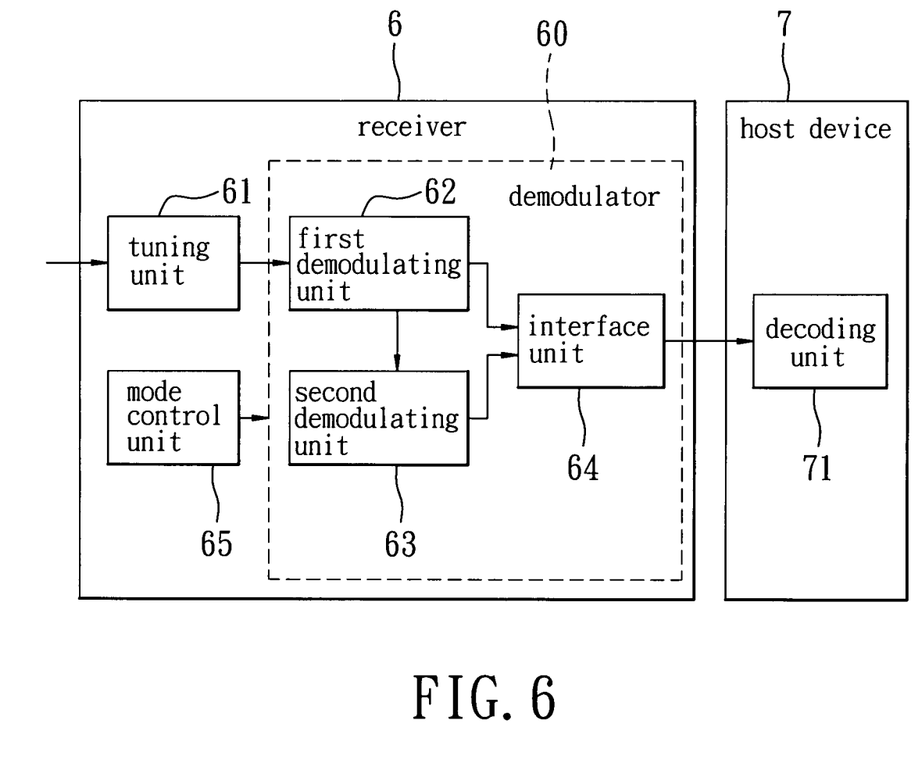
FIG. 6 is a block diagram to illustrate the third preferred embodiment of an integrated digital broadcasting receiver system according to the invention.
Figure 7:
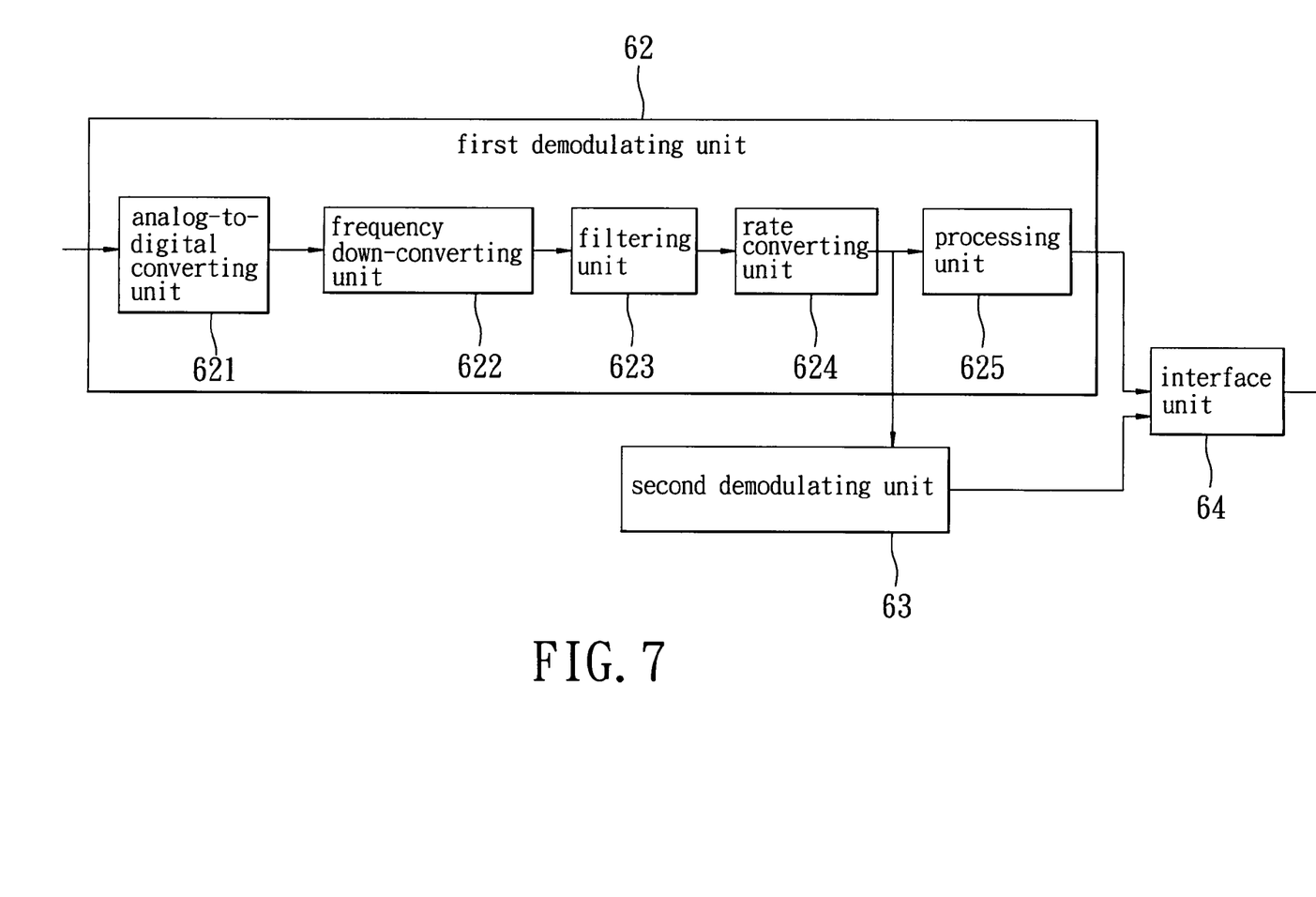
FIG. 7 is a block diagram to illustrate a first demodulating unit of the third preferred embodiment.

Referring to FIGS. 6 and 7, the third preferred embodiment of an integrated digital broadcasting receiver system (such as an audiovisual processing system) according to the present invention is adapted for DVB-T and DAB, and is operable under one of a DVB-T mode (i.e., a video processing mode) and a DAB mode (i.e., an audio processing mode).

The third preferred embodiment comprises a receiver 6 (such as a signal receiving circuit) and a host device 7. Transmission of data between the receiver 6 and the host device 7 is conducted through an interface. The receiver 6 comprises a tuning unit 61 (such as a tuner), a demodulator 60, and a mode control unit 65 (such as a mode control circuit). The demodulator 60 comprises a first demodulating unit 62 (such as a demodulating circuit), a second demodulating unit 63 (such as an audio processing circuit), and an interface unit 64 (such as an interface circuit). The host device 7 comprises a decoding unit 71 (such as a decoder).

Operations of the tuning unit 61 are identical to those of the tuning unit 41 of the second preferred embodiment, and will not be described herein for the sake of brevity.

The first demodulating unit 62 comprises an analog-to-digital converting unit 621 (such as an analog-to-digital converter), a frequency down-converting unit 622 (such as a frequency down-converter), a filtering unit 623, a rate converting unit 624, and a processing unit 625 (such as a video processing circuit). The operations of the analog-to-digital converting unit 621, the frequency down-converting unit 622, the filtering unit 623, and the rate converting unit 624 are substantially the same as those of the analog-to-digital converting unit 421, the frequency down-converting unit 422, the filtering unit 423, and the rate converting unit 424 of the second preferred embodiment, and will not be discussed herein for the sake of brevity. The processing unit 625 operates in the DVB-T mode, and performs demodulation operations, comprising fast Fourier transform, channel estimation, symbol demapping, deinterleaving, and Viterbi decoding, on the converted signal from the rate converting unit 624, so as to generate an MPEG transport stream (such as a demodulated video signal).

Figure 8:
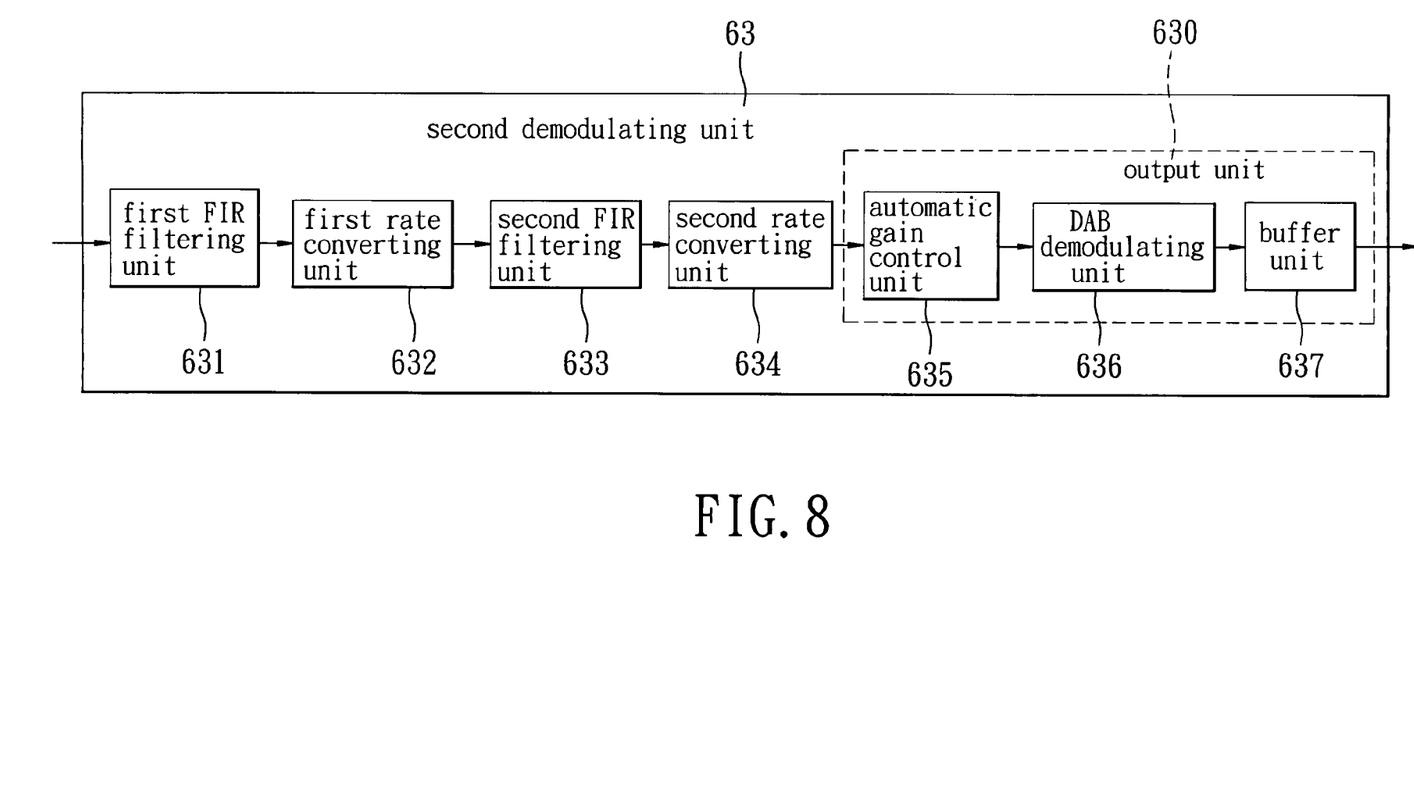
FIG. 8 is a block diagram to illustrate a second demodulating unit of the third preferred embodiment.

The second demodulating unit 63 operates under the DAB mode, and performs filtering, rate conversion, and demodulation on the converted signal from the rate converting unit 624 so as to generate an MPEG transport stream (such as a demodulated audio signal). Referring to FIG. 8, the second demodulating unit 63 comprises, in sequence, a first FIR filtering unit 631 (such as an audio filtering unit), a first rate converting unit 632 (such as an audio rate converting unit), a second FIR filtering unit 633 (such as an audio filtering unit), a second rate converting unit 634 (such as an audio rate converting unit), and an output unit 630. The output unit 630 comprises an automatic gain control unit 635 (such as an automatic gain control circuit), a DAB demodulating unit 636 (i.e., an audio demodulator), and a buffer unit 637 (such as a buffer), which are connected in series and in sequence. The first and second FIR filtering units 631, 633 are used to filter out unnecessary signal components. The first and second rate converting units 632, 634 are used to convert to an appropriate sampling rate by signal re-sampling. The automatic gain control unit 635 is used to adjust magnitude of the signal so as to generate a gain-controlled signal. The DAB demodulating unit 636 is used to demodulate the gain-controlled signal (comprising DAB mode automatic detection, frequency bias detection/compensation, signal frame/symbol edge detection, fast Fourier transform, D-QPSK demodulation, deinterleaving, FIC/MSC Viterbi decoding, and FIC decoding) so as to generate the demodulated audio signal. The buffer unit 637 is used for temporary signal storage.

Referring to FIGS. 6 and 7, when operating in the DVB-T mode, the interface unit 64 converts the MPEG transport stream from the first demodulating unit 62 into a signal transmittable thereby so as to generate an output signal, and transmits the output signal to the decoding unit 71 of the host device 7 for further decoding. When operating under the DAB mode, the interface unit 64 converts the MPEG transport stream from the second demodulating unit 63 into a signal transmittable thereby so as to generate the output signal, and transmits the output signal to the decoding unit 71 of the host device 7 for further decoding.

The mode control unit 65 controls the first demodulating unit 62, the second demodulating unit 63, and the interface unit 64 to operate according to one of the DVB-T mode and the DAB mode.

In the second and third preferred embodiments, the first tuning unit 21 and the second tuning unit 22 of the first preferred embodiment are reduced to one turning unit, and the first demodulating unit 23 and the second demodulating unit 24 of the first preferred embodiment are partly integrated, thereby reducing the overall cost of the present invention.

In the first to third preferred embodiments, the interface may be a USB interface or a PCI-E interface, without limiting the present invention thereto.

It is noted that the present invention is adapted for use in high-data-rate digital broadcasting (such as video broadcasting) and low-data-rate digital broadcasting (such as audio broadcasting), without limiting the invention to DVB-T and DAB exemplified in the preferred embodiments. The invention may be expanded to accommodate more specifications of digital broadcasting.

While the present invention has been described in connection with what are considered the most practical and preferred embodiments, it is understood that this invention is not limited to the disclosed embodiments but is intended to cover various arrangements comprised within the spirit and scope of the broadest interpretation so as to encompass all such modifications and equivalent arrangements.

We claim:

1. A signal receiving circuit adapted to generate an output signal based on a radio frequency signal, said signal receiving circuit comprising:
   a tuner for generating a tuned signal based on the radio frequency signal; and
   a demodulator for generating the output signal based on the tuned signal, said demodulator comprising:
      an analog-to-digital converter for generating a digital signal based on the tuned signal;
      a frequency down-converter for generating a frequency down-converted signal based on the digital signal;
      an audio processing circuit for generating a demodulated audio signal by demodulating the frequency down-converted signal in an audio processing mode;
      a video processing circuit for generating a demodulated video signal by demodulating the frequency down-converted signal in a video processing mode;
      an interface circuit for generating the output signal based on one of the demodulated audio signal and the demodulated video signal;
      a filtering unit for generating a filtered signal based on the frequency down-converted signal; and
      a rate converting unit for generating a converted signal based on the filtered signal;
      wherein said audio processing circuit generates the demodulated audio signal based on the converted signal in the audio processing mode, and said video processing circuit generates the demodulated video signal based on the converted signal in the video processing mode;
   and
   a mode control circuit coupled to said demodulator for controlling said demodulator to operate according to one of the audio processing mode and the video processing mode.

2. The signal receiving circuit according to claim 1, wherein said audio processing circuit comprises:
   at least one audio filtering unit for generating an audio filtering signal based on the frequency down-converted signal;
   at least one audio rate converting unit for generating an audio converted signal based on the audio filtering signal; and
   an output unit for generating the demodulated audio signal based on the audio converted signal.

3. The signal receiving circuit according to claim 2, wherein said output unit comprises:
   an automatic gain control circuit for generating a gain controlled signal based on the audio converted signal;
   an audio demodulator for generating the demodulated audio signal based on the gain controlled signal; and
   a buffer coupled to said audio demodulator and said interface circuit for receiving and outputting the demodulated audio signal.

4. An audiovisual processing system, comprising:
   a signal receiving circuit for generating an output signal based on a radio frequency signal, said signal receiving circuit comprising:
   a tuner for generating a tuned signal based on the radio frequency signal, and
   a demodulator for generating the output signal based on the tuned signal, said demodulator comprising:
      an analog-to-digital converter for generating a digital signal based on the tuned signal, a frequency down-converter for generating a frequency down-converted signal based on the digital signal, an audio pre-preprocessing circuit for generating an audio processing signal based on the frequency down-converted signal in an audio processing mode, a video processing circuit for generating a demodulated video signal by demodulating the frequency down-converted signal in a video processing mode,
      an interface circuit for generating the output signal based on the audio processing signal in the audio processing mode, and for generating the output signal based on the demodulated video signal in the video processing mode;
      a filtering unit for generating a filtered signal based on the frequency down-converted signal; and
      a rate converting unit for generating a converted signal based on the filtered signal;
      wherein said audio processing circuit generates the demodulated audio signal based on the converted signal in the audio processing mode, and said video processing circuit generates the demodulated video signal based on the converted signal in the video processing mode;
   a host device coupled to said signal receiving circuit for receiving the output signal, and for generating a demodulated audio signal based on the output signal in the audio processing mode; and
   a mode control circuit coupled to said demodulator for controlling said demodulator to operate according to one of the audio processing mode and the video processing mode.

5. The audiovisual processing system according to claim 4, wherein said audio preprocessing circuit comprises:
   at least one audio filtering unit for generating an audio filtering signal based on the frequency down-converted signal;
   at least one audio rate converting unit for generating an audio converted signal based on the audio filtering signal; and
   an output unit for generating the audio processing signal based on the audio converted signal.

6. The audiovisual processing system according to claim 5, wherein said output unit comprises:
   an automatic gain control circuit for generating the audio processing signal based on the audio converted signal; and
   a buffer coupled to said automatic gain control circuit and said interface circuit for receiving and outputting the audio processing signal.

7. The audiovisual processing system according to claim 4, wherein said host device further comprises:
   an audio demodulating circuit for generating the demodulated audio signal by demodulating the output signal in the audio processing mode;
   a selection circuit for outputting the output signal in the video processing mode and for outputting the demodulated audio signal in the audio processing mode; and
   a decoder for generating a decoded signal based on the output signal or the demodulated audio signal from said selection circuit.

* * * * *